June 26, 1956 P. A. J. DOURNAUD 2,752,261
HYDRAULIC BINDER
Filed Dec. 15, 1951
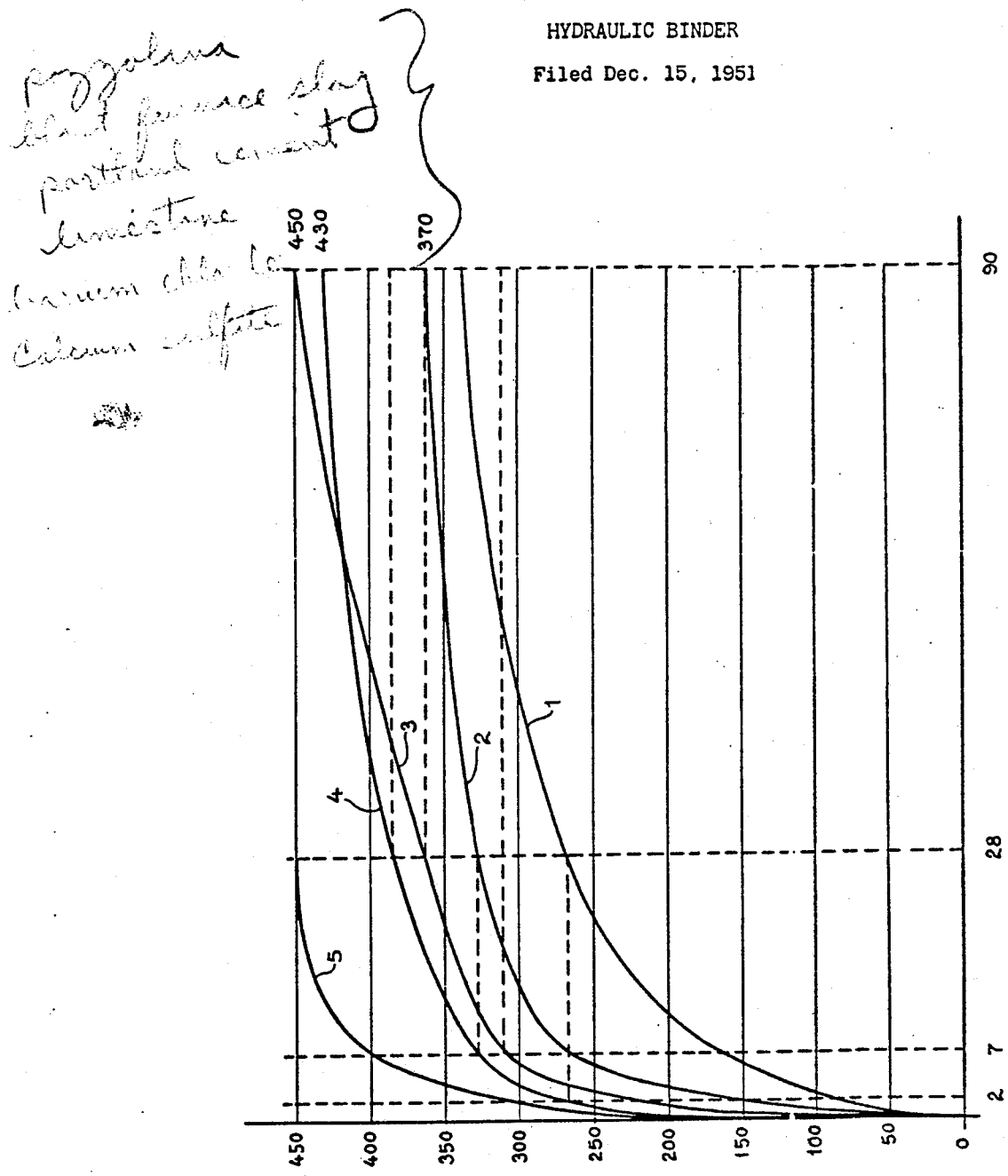
Inventor
Pierre Andre Jean Dournaud
By Robert E Burns
Attorney

United States Patent Office 2,752,261
Patented June 26, 1956

2,752,261
HYDRAULIC BINDER

Pierre André Jean Dournaud, Toulouse, France

Application December 15, 1951, Serial No. 261,845

Claims priority, application France December 18, 1950

8 Claims. (Cl. 106—117)

The present invention relates to a new hydraulic binder having a mechanical strength and a setting speed equal to or higher than those of Portland cements, but offering very important economical advantages.

It has been known for a long time that the pozzolanas, either natural or artificial, for instance the cellular lavas, which contain silica, alumina, ferric oxide and amorphous lime are suitable for the preparation of binders. The Romans, for instance, used the pozzolanas, crushed and mixed with fat lime to prepare real cements, the lime addition being necessary to restore the stoichiometric equilibrium which is necessary for the crystallization and the formation of crystals of lime silicates, of lime aluminates and of ferro aluminates, as the natural pozzolanas are acidic. Since the pozzolana constituents are in the amorphous state, this probably resulting from the fact that the pozzolana comes from lavas which were in an unbalanced chemical state when suddenly cooled, this pozzolana, after crushing and mixing with lime, and in the presence of water, acts like a very thin colloidal suspension, the components of which react very strongly and give rise, upon setting, to a real solid solution having a very high final mechanical strength.

The known pozzolanic cements offer nevertheless a very serious drawback because their setting is very slow and, as a result, they have but a very small initial strength and can reach a sufficient strength only after about 28 days. To obtain satisfactory initial strengths, it becomes therefore necessary to reduce in the pozzolanic cements the amount of pozzolana to about 25 to 30% and to use, in the mixing, 70 to 75% of artificial clinker. In view of the cost, this is of little interest, the only advantage of these cements consisting in their improved resistance to some water, selenitic water particularly.

The object of the present invention is to produce pozzolanic cements offering an initial strength similar to the strength of artificial Portland cements, so called "high initial strength cements," but maintaining the benefit of the low cost of the pozzolanic cements made without the addition of a large amount of artificial cement.

The cement, according to the invention, is characterized in that it is made with a mixture of pozzolana and of blast furnace granulated slag, in the proportion effective to establish between the components an equilibrium which allows the formation of a crystallized system.

As the blast furnace slag is basic, it will restore the necessary equilibrium for crystallization by balancing the acidity of the pozzolana. In addition, the granulated blast furnace slag resulting from the sudden cooling in water of the melting slag, contains a dicalcium silicate which has the property of losing instantaneously, in the presence of water, a lime molecule, thus starting the reaction with the silica.

According to an other important feature of the invention, this cement contains also calcium sulphate and/or a chloride (specially calcium chloride) and preferably barium chloride. The inventor has indeed discovered that the most important cause of the slow setting of the pozzolanic cements resides in the immediate production of aluminic and alumino-ferric gels which considerably impede the reaction of the silica with the lime. It is known that in a complex reactive medium, the reactions tending to first take place are the reactions giving off the most heat. As a result, when the crushed mixture of pozzolana and lime is brought into the presence of water, the lime first reacts with the alumina, thus forming alumino-ferric gels with the alumina and the ferric oxide, and these gels delay the chief reaction of the lime with the silica which leads to the formation of the crystallized silicates, conferring its strength to the cement. The silicates have effectively as a rule the property of attacking the aluminates, whereas the alumino-ferric gels are destroyed by the chlorides.

It must be noted that some of these salts have already been used in addition to the Portland cements, but only at the time of mixing with water, as catalytic agents for the hydration and not to prevent the formation of aluminates or ferro-aluminate gels as these gels are not formed, or are formed in very small amounts, in the artificial cements.

It must be noted that the addition of sulphates and chlorides to the slag cements (without an addition of pozzolana) permits also, through the destruction of the aluminic gels which tend to be formed, an increase of the setting speed of such cements, thus reducing in a marked manner, the amount of clinker which it is usually necessary to add to these cements to gain a satisfactory initial strength.

Concerning the proportions of the various components of the cement according to the invention, it must be noted that they vary according to the raw materials used. In particular, as the pozzolanas have, depending upon their source, a more or less high silica and alumina content, they need a more or less large amount of slag to restore the crystallization equilibrium. It must be noted that the natural pozzolanas can also be replaced according to the invention by powdery ashes resulting from the combustion of coals such as the coals used to feed the boiler furnaces in electric power houses. In all the cases, the cement according to the invention is constituted by a mixture of natural or artificial pozzolanas with granulated blast furnace slag and does not need any heating for its preparation, the only necessary fuel being the fuel used to dry the raw materials, thus giving, in relation to the artificial cements, a coal saving ranging up to 250 kg. per ton of cement produced.

As an example, a method for the preparation of the cement according to the invention is described hereafter, the mechanical properties of the cement as compared with the properties of the chief types of cements known being illustrated in the annexed drawing.

In the drawing the curve 1 shows, as a function of the time, the increase in strength of the usual pozzolanic cement, containing 30% of pozzolana and 70% of Portland cement. One sees that it is only after 28 days that such a cement will reach the strength of about 270 kg., a strength which is reached after 7 days by the usual Portland cement (curve 2) and in 2 days by a Portland cement "with a high initial strength" (curve 4), produced by a fine grinding, by an increase in the tricalcium silicate content and by a double burning. The cement according to the invention (curve 3) an example of which is given hereafter, makes possible an initial strength slightly smaller than the strength of the Portland cement with a high initial strength, and a final strength slightly higher.

As above indicated, the first problem to be solved in the preparation of a pozzolanic cement consists in obtaining an alkaline correction to balance the acidity of the pozzolana and to reach the equilibrium conditions which are necessary for crystallization. As above indicated, this correction, according to the invention, is carried on, not by an addition of lime or of Portland cement, but by the addition of a granulated blast furnace slag, a raw material easy to find in large quantities and at a low price. The two chief components of the cement according to the invention are dried and ground together to the same fineness as a Portland cement having a high initial strength.

The second problem consists, upon the addition of the tempering water, in bringing quickly in solution the silica and the alumina. In order to facilitate the operation, it is proposed, according to the invention, to add to the ground mixture an alkaline component, since the silica and alumina are soluble in alkalis. This addition of alkali is made in the form of an alkaline salt, preferably sulphate of ammonia. The ammonia is shifted by the lime which brings into solution the silica and the alumina by preventing the formation of protective layers by the aluminates and promoting the reaction in sequence of the silica and the lime. One knows that, as the lime passes into solution, it coalesces with the silica and the solution is no longer saturated with lime, thus allowing a new amount of lime to pass into solution and to coalesce with the silica, and so on, this sequence lasting possibly until the total amount of lime has entered into combination.

A third problem, which has been set forth above, consists in preventing the formation of aluminic and ferro aluminic gels. The problem is solved by the addition, during crushing, or in the tempering water, 1 to 3% by weight of calcium sulphate, which attacks the aluminic gels, and 1 to 3% by weight of chlorides, e. g. calcium chloride, which attack the aluminoferritic gels. The addition of said salts, which are hygroscopic (the chlorides particularly) may result in making the cement sensitive to the moisture. Advantageously, therefore, the calcium chloride is replaced by barium chloride, which is not hygroscopic, and seems to have an even more effective action, on account of its reaction with the calcium sulphate. Indeed, with the addition of barium chloride in a solution of calcium sulphate, a double decomposition takes place, according to the reaction:

$$CaSO_4 + BaCl_2 \cdot 2N_2O \rightarrow BaSO_4 + CaCl_2 + 2H_2O$$

The result is that, upon tempering with water, a calcium chloride in the nascent state is formed which has a greater action on the gels to be destroyed. It is nevertheless necessary to proportion the addition of barium chloride so that part of the calcium sulphate is left unattacked and will act on the lime to dissolve it and promote the reaction in sequence of silica-lime, as above indicated.

According to another characteristic feature of the invention, the starting of the reaction is produced by adding, in a rather small proportion, tricalcium silicate, in addition to the tricalcium silicate already contained in the granulated slag, for instance in the form of about 5 to 10% of Portland cement or of an alkaline salt, a sodium sulphate or silicate for instance.

Finally, as the speed of formation of the crystallized system depends in part on the temperature (one knows that this crystallization is for instance, much faster when it is adiabatic without yielding to the ambient medium the heat given off by the reaction), one adds to the mixture some quick-lime, preferably in the form of crushed lime stone, for instance in an amount of 3%, thus giving rise to a further liberation of heat of 9.85 calories per kilogram of cement.

As an example, a cement according to the invention shall be described. It is made with a pozzolana constituted by volcanic scorias with the following composition:

| | Percent |
|---|---|
| $SiO_2$ | 46 |
| $Al_2O_3$ | 15 |
| $FeO_3$ | 12 |
| $CaO$ | 9 |
| $MgO$ | 4 |
| $K_2O$ | 6 |
| $NaO$ | | and with a granulated slag having the following composition:

| | Percent |
|---|---|
| $SiO_2$ | 30 |
| $Al_2O_3$ | 11 |
| $CaO$ | 51 |
| $Fe$ | 0.3 |
| $Mn$ | 0.4 |
| $S$ | 3 |

With these two chief components, a cement was made, including:

| | Percent |
|---|---|
| Granulated slag | 56 |
| Pozzolana | 30 |
| Portland cement | 7 |
| Limestone | 3 |
| Calcium sulphate | 3 |
| Barium chloride | 1 |

The whole was mixed, dried and crushed, to a degree of fineness giving a residue of 4% on a screen of 4900 meshes.

This cement has shown in tests the following resistances, as shown by the curve 3 of the annexed drawing:

| | Kg./cm.$^2$ |
|---|---|
| After 48 hours | 214 |
| After 7 days | 315 |
| After 28 days | 365 |
| After 90 days | 450 | showing thereby an initial resistance very close to the initial resistance of Portland cement having a high initial resistance (curve 4) and a higher final resistance after 90 days.

With the addition to the above mixture of 0.5% of ammonium sulphate the tests have shown a strength illustrated by the curve 5:

| | Kg./cm.$^2$ |
|---|---|
| After 48 hours | 300 |
| After 7 days | 400 |
| After 28 days | 450 | this strength is very distinctly higher than the strength of a Portland cement having been baked twice (curve 4), and with a much lower cost.

The cement according to the invention can be used for very many purposes, in particular for the making of a cellular concrete, for the cold manufacture of tiles and bricks and can also be used, with the addition of a metallic powder or of any other means to produce air-entrainment, concretes or aerated concretes.

What I claim is:

1. Cement constituted by a mixture of:

56% in weight of blast furnace granulated slag comprising 30% of $SiO_2$ and 51% of $CaO$
30% of pozzolana comprising 46% of $SiO_2$ and 9% of $CaO$
7% Portland cement
3% lime stone
3% calcium sulphate
1% barium chloride, crushed to a degree of fineness giving an oversize of 4% on a screen having 4900 meshes.

2. Cement according to the claim 1 with the addition of 0.5% of sulphate of ammonia.

3. A water setting cement composition formed by a mixture of pozzolana and of basic water granulated blast furnace slag wherein the proportions of pozzolana and of blast furnace slag are selected to neutralize the acidity of pozzolana, said mixture further comprising calcium sulphate and calcium chloride each in a proportion from 1% to 3% to prevent the formation of aluminic and ferro-aluminic gels respectively.

4. A water setting cement composition formed by a mixture of pozzolana and of basic water granulated blast furnace slag wherein the proportions of pozzolana and of blast furnace slag are selected to neutralize the acidity of pozzolana, said mixture further comprising calcium sulphate and barium chloride each in a proportion from 1% to 3% of the total weight of the mixture, whereby calcium chloride in a nascent state is formed in presence of water allowing the aluminic and ferroaluminic gels to be destroyed.

5. A water setting cement composition formed by a mixture of pozzolana and of basic water granulated blast furnace slag wherein the proportions of pozzolana and of blast furnace slag are selected to neutralize the acidity of pozzolana, said mixture further comprising calcium sulphate and barium chloride each in a proportion from 1% to 3% of the total weight of the mixture, whereby calcium chloride in a nascent state is formed in presence of water allowing the aluminic and ferroaluminic gels to be destroyed, and ammonium sulphate in a proportion of about 0.5%.

6. A water setting cement composition formed by a mixture of pozzolana, of basic water granulated blast furnace slag and of tricalcium silicate in the proportion of 5% to 10% of the total weight of the mixture, whereby the proportions of pozzolana and blast furnace slag are selected to neutralize the acidity of pozzolana, the mixture further comprising calcium sulphate and barium chloride each in the proportion from 1% to 3% of the total weight of the mixture.

7. A water setting cement composition formed by a mixture of pozzolana, of basic water granulated blast furnace slag and of Portland cement in the proportion of 5% to 10% of the total weight of the mixture, whereby the proportions of pozzolana and blast furnace slag are selected to neutralize the acidity of pozzolana, the mixture further comprising calcium sulphate and barium chloride each in the proportion from 1% to 3% of the total weight of the mixture.

8. A water setting cement composition formed by a mixture of pozzolana, of basic water granulated blast furnace slag and of crushed lime stone in a proportion of about 3% of the total weight of the mixture, whereby the proportions of pozzolana and blast furnace slag are selected to neutralize the acidity of pozzolana, the mixture further comprising calcium sulphate and barium chloride each in the proportion from 1% to 3% of the total weight of the mixture.

References Cited in the file of this patent

UNITED STATES PATENTS

| Number | Name | Date |
|---|---|---|
| 270,608 | Roth | Jan. 16, 1883 |
| 1,033,984 | Brown | July 30, 1912 |
| 1,465,115 | Cordery | Aug. 14, 1923 |
| 1,627,237 | Harding | May 3, 1927 |
| 1,831,702 | Cadre | Nov. 10, 1931 |
| 1,912,883 | Blank | June 6, 1933 |
| 1,997,782 | Windecker | Apr. 16, 1935 |
| 2,116,469 | Karwat | May 3, 1938 |
| 2,125,520 | Parker et al. | Aug. 2, 1938 |
| 2,302,988 | Witty | Nov. 24, 1942 |
| 2,446,990 | Schuetz | Aug. 10, 1948 |

FOREIGN PATENTS

| Number | Country | Date |
|---|---|---|
| 12,621 | Great Britain | of 1906 |
| 467 | Great Britain | of 1908 |
| 546,629 | Great Britain | July 22, 1942 |